(12) United States Patent
Wang et al.

(10) Patent No.: US 12,537,422 B1
(45) Date of Patent: Jan. 27, 2026

(54) AXIAL FLUX MACHINE AND STATOR FOR AXIAL FLUX MACHINE

(71) Applicant: Chang Gung International Energy Inc., Taipei (TW)

(72) Inventors: Kuei Yung Wang, Taipei (TW); Yu-Ting Chen, Taipei (TW); Quang Anh Nguyen, Taipei (TW)

(73) Assignee: Chang Gung International Energy Inc., Taipei (TW)

( * ) Notice: Subject to any disclaimer, the term of this patent is extended or adjusted under 35 U.S.C. 154(b) by 0 days.

(21) Appl. No.: 19/230,782

(22) Filed: Jun. 6, 2025

(30) Foreign Application Priority Data

Nov. 6, 2024 (EP) .................................... 24211252

(51) Int. Cl.
*H02K 9/22* (2006.01)
*H02K 1/14* (2006.01)
*H02K 21/24* (2006.01)

(52) U.S. Cl.
CPC ............ *H02K 9/223* (2021.01); *H02K 1/146* (2013.01); *H02K 21/24* (2013.01)

(58) Field of Classification Search
CPC ......... H02K 9/223; H02K 1/146; H02K 21/24
USPC ............................................................ 310/64
See application file for complete search history.

(56) References Cited

U.S. PATENT DOCUMENTS

| | | | | |
|---|---|---|---|---|
| 6,690,099 B2* | 2/2004 | Asao | ...................... | H02K 9/06 310/216.069 |
| 7,105,975 B2* | 9/2006 | Semones | ................ | H02K 21/24 310/268 |
| 7,332,837 B2* | 2/2008 | Ward | .................... | H02K 1/2798 310/52 |
| 7,468,569 B2* | 12/2008 | Hirzel | ...................... | H02K 3/12 310/216.006 |
| 7,683,516 B2* | 3/2010 | Ishigami | ................ | H02K 3/522 310/179 |
| 7,737,598 B2* | 6/2010 | Ionel | ........................ | H02K 3/28 310/216.058 |
| 8,590,137 B2* | 11/2013 | Urano | .................... | H02K 1/148 310/216.008 |
| 10,447,102 B2* | 10/2019 | Patterson | .............. | H02K 1/2795 |
| 10,868,461 B2* | 12/2020 | Patel | ........................ | H02K 1/27 |

(Continued)

FOREIGN PATENT DOCUMENTS

| | | | | |
|---|---|---|---|---|
| CN | 117157856 A | * | 12/2023 | ............. H02K 3/24 |
| DE | 29821564 U1 | * | 7/2000 | ............. H02K 9/223 |
| EP | 4178094 A1 | * | 5/2023 | ............. H02K 21/24 |

*Primary Examiner* — Alex W Mok
(74) *Attorney, Agent, or Firm* — Renner, Kenner, Greive, Bobak, Taylor & Weber (57) ABSTRACT

A stator for an axial flux machine includes a plurality of units (100; 200; 400) disposed generally circumferentially around an axis. Each of the units (100; 200; 400) is operable to generate a magnetic field generally parallel to the axis. Each of the units (100; 200; 400) respectively includes: an axially extending stator core tooth (102T; 202T; 402T) defining at least part of a stator core, and a set of windings (102C; 202C; 402C) wound around the stator core tooth. The stator includes a heat dissipation arrangement for facilitating dissipation of heat from the stator core during operation of the stator. By facilitating dissipation of heat generated or accumulated in the stator core during operation of the stator, the performance, efficiency and/or lifespan of the stator can be improved.

22 Claims, 8 Drawing Sheets

(56) References Cited

U.S. PATENT DOCUMENTS

| | | | |
|---|---|---|---|
| 11,121,596 B2* | 9/2021 | Hattori | H02K 1/146 |
| 11,349,359 B2* | 5/2022 | Kislev | H02K 1/187 |
| 11,387,710 B2* | 7/2022 | Vansompel | H02K 9/227 |
| 11,831,202 B2* | 11/2023 | Kislev | H02K 1/2786 |
| 2019/0288584 A1* | 9/2019 | Vansompel | H02K 9/227 |
| 2023/0396113 A1* | 12/2023 | Zhu | H02K 1/146 |
| 2024/0120781 A1* | 4/2024 | Zhu | H02K 1/165 |
| 2024/0146134 A1* | 5/2024 | Menhart | H02K 1/146 |
| 2024/0186871 A1* | 6/2024 | Zhang | H02K 21/24 |

* cited by examiner

AXIAL FLUX MACHINE AND STATOR FOR AXIAL FLUX MACHINE

TECHNICAL FIELD

Embodiments disclosed herein relate to an axial flux machine and a stator for an axial flux machine.

BACKGROUND

GB2585357A and GB2619413A have disclosed some existing axial flux machines.

During operation, heat may be generated or accumulated in various components of the axial flux machine (e.g., its stator), e.g., due to resistive loss, magnetic loss, stray loss, friction and mechanical loss, etc. This heat, if not properly and timely dissipated, may undesirably affect the performance, efficiency, and/or lifespan of the axial flux machine.

SUMMARY

In a first aspect, there is provided a stator for an axial flux machine. The stator comprises a plurality of units disposed generally circumferentially around an axis. Each of the units is operable to generate a magnetic field generally parallel to the axis. Each of the units respectively comprises: an axially extending stator core tooth defining part of a stator core, and a set of windings wound around the stator core tooth. The stator comprises a heat dissipation arrangement for facilitating dissipation of heat from the stator core (at least the stator core tooth) during operation of the stator. By facilitating dissipation of heat generated or accumulated in the stator core (at least the stator core tooth) during operation of the stator, the performance, efficiency and/or lifespan of the stator (and hence the axial flux machine) may be improved. For example, overheat damages to stator components (e.g., stator housing, adhesives used in the stator) can be reduced. For example, the duration in which the axial flux machine can maintain peak power during operation can be increased.

In one embodiment, the heat dissipation arrangement comprises: for at least one of the units, one or more materials thermally coupled between the stator core (at least the stator core tooth) and a corresponding set of windings to enable or facilitate heat conduction (i.e., heat transfer by conduction) between the stator core (at least the stator core tooth) and the corresponding set of windings. The one or more materials may be arranged in one or more layers. By enabling or improving heat conduction between the stator core and the corresponding set of windings in at least one of the units, heat generated or accumulated in the stator core during operation of the stator may be dissipated more quickly and/or more effectively. In an example in which the stator is yokeless (i.e., the stator cores of the units are not in thermal contact with a yoke and are not in thermal contact with each other), heat conduction between the stator core and the corresponding set of windings may be particularly useful for facilitating heat dissipation from the stator core.

In one embodiment, the heat dissipation arrangement comprises: for each respective one of the units, one or more materials thermally coupled between the stator core (at least the stator core tooth) and a corresponding set of windings to enable or facilitate heat conduction between the stator core (at least the stator core tooth) and the corresponding set of windings. The one or more materials of different units may be separated (i.e., not in direct contact with each other). The one or more materials of different units may be the same (i.e., same composition) or different (i.e., different compositions).

In one embodiment, the one or more materials comprises a thermally conductive and electrically insulating material. For example, the one or more materials may consist only of the thermally conductive and electrically insulating material. For example, the one or more materials may include at least one other material (in addition to the thermally conductive and electrically insulating material).

In one embodiment, the thermally conductive and electrically insulating material comprises a potting material. The potting material may include a potting compound (e.g., epoxy-resin, with or without additive for improving thermal conductivity). The potting material can provide not only thermal conduction and electrical insulation between the stator core (at least the stator core tooth) and the set of windings, but may also provide improved mechanical strength, improved vibration or shock resistance, improved corrosion protection, and/or improved chemical protection for the stator.

In one embodiment, the one or more materials is arranged (e.g., disposed) at least partly in a gap between the stator core tooth and the corresponding set of windings. In one embodiment, the one or more materials is filled (substantially completely) in the gap. The one or more materials in the gap may provide a more uniform and/or more effective thermal coupling between the stator core tooth (or more generally the stator core) and the corresponding set of windings. This may be particularly useful for stator in which the gap between the stator core tooth and the corresponding set of windings that is sized and/or shaped such that coolant fluid (e.g., gas or liquid for cooling, e.g., air, oil, etc.) cannot effectively enter and/or flow in the gap (heat cannot be effectively carried away if the coolant fluid cannot enter and effectively flow).

In one embodiment, the set of windings is provided by a wire (e.g., copper wire) and the one or more materials is further arranged (e.g., disposed) at least partly in a space between adjacent turns of the wire. The one or more materials may enable or facilitate heat conduction between adjacent turns of the wire. This may be particularly useful for stator in which the space between adjacent turns of the wire that is sized and/or shaped such that coolant fluid cannot effectively enter and/or flow in the space. In one embodiment, the one or more materials is filled (substantially completely) in the space between adjacent turns of the wire. The one or more materials may provide a more uniform and/or more effective thermal coupling between adjacent turns of the wire.

For each of the units, the set of windings provided by the wire has a turn density, which may be relatively high or relatively low. The cross section of the wire may be circular, square, rectangular, elliptical, or hexagonal.

In one embodiment in which the turn density is relatively low, a ratio of a width of the space between adjacent turns of the wire to a cross sectional width of the wire is between about 1:1 to about 2:1, where the width of the space and the cross sectional width are both in a direction parallel to the axis. By arranging the one or more materials in the space between adjacent turns of the wire and optimizing the turn density, an optimal balance may be obtained between the turns per unit length of the windings and the effectiveness of heat dissipation from the stator core during operation of the stator.

In one embodiment in which the turn density is relatively high, a ratio of a width of the space between adjacent turns of the wire to a cross sectional width of the wire is less than 1:1, where the width of the space and the cross sectional width are both in a direction parallel to the axis.

In one embodiment, the one or more materials is arranged (e.g., disposed) such that part of the corresponding set of windings is exposed. In other words, the one or more materials do not completely cover the corresponding set of windings. The exposed part of the set of windings can thus contact a flow of coolant fluid. For example, the one or more materials may be arranged only in the gap between the stator core tooth and the corresponding set of windings and in the space between adjacent turns of the wire of the corresponding set of windings.

In one embodiment, each of the at least one unit with the one or more materials comprises: an electrically insulating material arranged between the stator core tooth and the one or more materials. The electrically insulating material can provide a more reliable electrical insulation between the stator core tooth (or more generally the stator core) and the corresponding set of windings, as the one or more materials may degrade, fatigue, be damaged, and/or worn out over time. The electrically insulating material may be arranged in a layer. In one example, the electrically insulating material has a lower thermal conductivity than the one or more materials. In one example, the electrically insulating material has the same thermal conductivity as the one or more materials. In one example, the electrically insulating material has a higher thermal conductivity than the one or more materials. In one example, the one or more materials is arranged in a relatively thick layer and the electrically insulating material is arranged in a relatively thin layer (e.g., from about 10 microns to about 1000 microns).

In one embodiment, at least one of the units comprises: a first stator core shoe arranged at a first axial end of the stator core tooth, and a second stator core shoe arranged at a second axial end of the stator core tooth. The first stator core shoe and the second stator core shoe define part of the stator core. In other words, the stator core includes at least the stator core tooth and the first and second stator core shoes. The first stator core shoe and/or the second stator core shoe may be integrally formed with the stator core tooth. Or, the first stator core shoe and/or the second stator core shoe may be separately formed from and attached to the stator core tooth. An inner surface of the first stator core shoe, an inner surface of the second stator core shoe, and a surface of the stator core tooth together define a channel (e.g., loop-like channel). The inner surfaces of the first and second stator core shoes face each other.

The set of windings may or may not contact the first stator core shoe and/or the second stator core shoe.

In one embodiment, at least part of the inner surface of the first stator core shoe is exposed and/or at least part of the inner surface of the second stator core shoe is exposed to provide the heat dissipation arrangement. By exposing at least part of the inner surface of the first stator core shoe and/or at least part of the inner surface of the second stator core shoe, a flow of coolant fluid can contact the exposed surface(s) to dissipate heat from first stator core shoe and/or the second stator core shoe, and hence from the stator core tooth (or more generally the stator core), during operation of the stator. In an embodiment in which the unit includes the one or more materials and the first and second stator core shoes, the one or more materials may or may not contact the inner surface of the first stator core shoe and/or the inner surface of the second stator core shoe.

In one embodiment, the entire inner surface of the first stator core shoe is covered, e.g., by the one or more materials, hence is not exposed, and/or the entire inner surface of the second stator core shoe is covered, e.g., by the one or more materials, hence is not exposed.

In one embodiment, each of the units comprises the first and second stator core shoes. For each unit, the corresponding first and second stator core shoes define part of the stator core. In other words, for each unit, the corresponding stator core includes at least the stator core tooth and the first and second stator core shoes.

In one embodiment, the inner surface of the first stator core shoe comprises a radially innermost portion defining a radially innermost end and a radially outermost portion defining a radially outermost end, and the exposed part of the inner surface of the first stator core shoe comprises the radially innermost portion and/or the radially outermost portion. In one embodiment, the radially innermost end is closer to the axis than a radially innermost end defined by components received in the channel, and/or the radially outermost end is further away from the axis than a radially outermost end defined by components received in the channel. The components received in the channel may include the set of windings, the one or more materials (if present), etc. With this arrangement, a larger part of the inner surface of the first stator core shoe may be exposed in the radial direction for facilitating heat dissipation from the first stator core shoe and hence from the stator core tooth (or more generally the stator core) during operation of the stator, e.g., without having to reduce the circumferential density and/or compactness of generally circumferentially disposed units.

When viewed generally perpendicular to the axis, the first stator core shoe may have a generally triangular, generally rectangular, or generally trapezoidal cross section. Other cross sectional shape may also be possible. In one example, when viewed generally perpendicular to the axis, the first stator core shoe has a generally trapezoidal cross-section, with a short base providing the radially innermost end and a long base providing the radially outermost end.

In one embodiment, the inner surface of the second stator core shoe comprises a radially innermost portion defining a radially innermost end and a radially outermost portion defining a radially outermost end, and the exposed part of the inner surface of the second stator core shoe comprises the radially innermost portion and/or the radially outermost portion. In one embodiment, the radially innermost end is closer to the axis than a radially innermost end defined by components received in the channel, and/or the radially outermost end is further away from the axis than a radially outermost end defined by components received in the channel. The components received in the channel may include the set of windings, the one or more materials (if present), etc. With this arrangement, a larger part of the inner surface of the second stator core shoe may be exposed in the radial direction for facilitating heat dissipation from the second stator core shoe and hence from the stator core tooth (or more generally the stator core) during operation of the stator, e.g., without having to reduce the circumferential density and/or compactness of generally circumferentially disposed units.

When viewed generally perpendicular to the axis, the second stator core shoe may have a generally triangular, generally rectangular, or generally trapezoidal cross section. Other cross sectional shape may also be possible. In one example, when viewed generally perpendicular to the axis, the second stator core shoe has a generally trapezoidal cross-section, with a short base providing the radially innermost end and a long base providing the radially outermost end.

In one embodiment, the stator comprises a stator housing receiving the plurality of units and comprising a first wall including one or more first cavities each receiving a respective first stator core shoe. The first stator core shoe may be bonded to the corresponding first cavity by adhesive. The first wall may be made of composite material. The heat dissipation arrangement may help to reduce undesirable effect of the heat on the adhesive and/or the first wall.

In one embodiment, the heat dissipation arrangement comprises, for each of the one or more first cavities, at least one opening arranged at a location corresponding to the first cavity to expose at least part of an outer surface of the first stator core shoe. By exposing at least part of the outer surface of the first stator core shoe, a flow of coolant fluid can contact the exposed surface to dissipate heat from first stator core shoe and hence from the stator core tooth (or more generally the stator core) during operation of the stator. In one example, the coolant fluid is air (natural or forced air flow).

The at least one opening for the first cavity can each be of any shape and/or geometry (e.g., the opening can be circular, polygonal, squared, rectangular, etc.). In one embodiment, the at least one opening for the first cavity comprises an opening having substantially the same shape and/or center as, and a smaller size than, an outer surface of the corresponding first stator core shoe. Such an opening may promote more uniform heat dissipation from the outer surface of the first stator core shoe.

In one embodiment, the stator housing comprises a second wall including one or more second cavities each receiving a respective second stator core shoe. The second stator core shoe may be bonded to the corresponding second cavity by adhesive. The second wall may be made of composite material. The heat dissipation arrangement may help to reduce undesirable effect of the heat on the adhesive and/or the second wall.

In one embodiment in which at least one of the units includes the one or more materials, the one or more materials do not contact the first wall and/or the second wall. For example, the one or more materials do not contact the stator housing.

In one embodiment in which at least one of the units includes the one or more materials, the one or more materials contacts the first wall and/or the second wall. For example, the one or more materials contacts the stator housing.

In one embodiment, the heat dissipation arrangement comprises, for each of the one or more second cavities, at least one opening arranged at a location corresponding to the second cavity to expose at least part of an outer surface of the second stator core shoe. By exposing at least part of the outer surface of the second stator core shoe, a flow of coolant fluid can contact the exposed surface to dissipate heat from second stator core shoe and hence from the stator core tooth (or more generally the stator core) during operation of the stator. In one example, the coolant fluid is air (natural or forced air flow).

The at least one opening for the second cavity can each be of any shape and/or geometry (e.g., the opening can be circular, polygonal, squared, rectangular, etc.). In one embodiment, the at least one opening for the second cavity comprises an opening having substantially the same shape and/or center as, and a smaller size than, an outer surface of the corresponding second stator core shoe. Such an opening may promote more uniform heat dissipation from the outer surface of the second stator core shoe.

In one embodiment, each of the units comprises a first stator core shoe arranged at a first axial end of the stator core tooth, and a second stator core shoe arranged at a second axial end of the stator core tooth, and the stator further comprises a stator housing. The first stator core shoe and the second stator core shoe define part of the stator core. The stator housing receives the plurality of units. The stator housing comprises a first wall including first cavities each receiving a respective first stator core shoe and a second wall including second cavities each receiving a respective second stator core shoe. The heat dissipation arrangement comprises, for each of the units: (i) one or more materials thermally coupled between the stator core (at least the stator core tooth) and a corresponding set of windings to enable or facilitate heat conduction between the stator core (at least the stator core tooth) and the corresponding set of windings, (ii) at least part of an inner surface of the first stator core shoe that is exposed, (iii) at least part of an inner surface of the second stator core shoe that is exposed, (iv) for each of the first cavities, an opening arranged at a location corresponding to the first cavity to expose part of an outer surface of the first stator core shoe, and (v) for each of the second cavities, an opening arranged at a location corresponding to the second cavity to expose part of an outer surface of the second stator core shoe. Such heat dissipation arrangement may more effectively and/or more uniformly dissipate heat from the various stator components/parts, including the stator cores.

In a second aspect, there is provided an axial flux machine comprising at least one stator of the first aspect and at least one rotor. The axial flux machine may be a motor or a generator.

In one embodiment, the axial flux machine is a double-stator single-rotor machine (e.g., AFIR type), in which the stators and the rotor are arranged co-axially, e.g., with respect to the axis the plurality of units is disposed generally circumferentially around.

In one embodiment, the axial flux machine is a single-stator double-rotor machine (e.g., TORUS type or AFIS type), in which the rotors and the stator are arranged co-axially, e.g., with respect to the axis the plurality of units is disposed generally circumferentially around.

In one embodiment, the axial flux machine is a yokeless and segmented armature (YASA) machine.

In a third aspect, there is provided an electrical device or system comprising the axial flux machine of the second aspect.

Other features and aspects will become apparent by consideration of the detailed description and accompanying drawings. Any feature(s) described herein in relation to one aspect or embodiment may be combined with any other feature(s) described herein in relation to any other aspect or embodiment as appropriate and applicable.

Unless otherwise specified, terms of degree such as "generally", "about", "substantially", etc., are used herein to account for one or more of: manufacture tolerance, degradation, trend, tendency, imperfect practical condition(s), etc. For example, when a value is modified by a term of degree, such as "about", such expression includes the stated value +20%, +15%, +10%, +5%, +2%, or +1%.

Unless otherwise specified, terms such as "connected" and "coupled" are intended to encompass both direct and indirect connection and coupling.

As used herein, the stator core includes a stator core tooth and optionally one or more stator core shoes coupled with the stator core tooth. In one example, a stator core only includes a stator core tooth and does not include any stator core shoes. In one example, a stator core includes a stator core tooth and at least one stator core shoe coupled with the stator core tooth. As used herein, the stator core tooth refers to the part of the stator around which the stator coil is wound, regardless of the type of axial flux machine. The stator core tooth may be made of laminated silicon steel (although in some designs, the stator core tooth may be made of other materials). For example, for a YASA type machine, the stator core includes the individual segmented core. For example, for a TORUS or AFIS or AFIR type machine, the stator core includes at least individual tooth of the stator.

BRIEF DESCRIPTION OF THE DRAWINGS

Embodiments of the invention will now be described, by way of example, with reference to the accompanying drawings in which.

DETAILED DESCRIPTION

Embodiments provided herein relate to a stator for an axial flux machine, and in particular, heat dissipation arrangement of the stator. For ease of presentation, only the relevant parts/components of the stator are described herein and schematically illustrated in the drawings. A person skilled in the art is familiar with stator for axial flux machine, and would appreciate that the stator may include other stator parts/components necessary for its operation.

Figure 1:
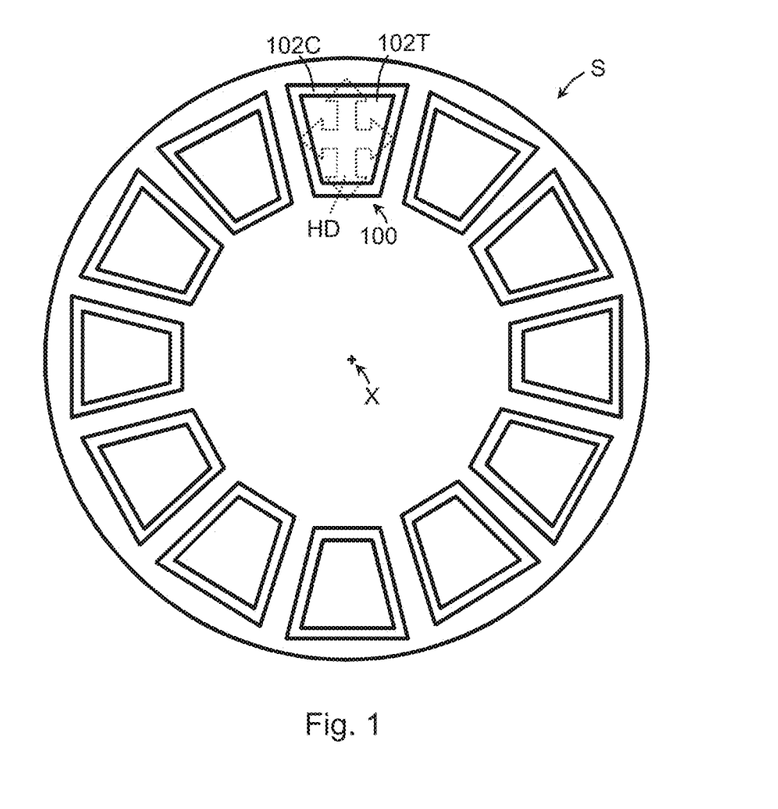
FIG. 1 is a schematic diagram of a stator for an axial flux machine in one embodiment.

FIG. 1 schematically shows a stator S for an axial flux machine in one embodiment. In this embodiment, the stator S includes twelve units 100 disposed generally circumferentially around axis X. Each unit 100 includes a stator core tooth 102T that extends axially (parallel to the axis X) and a set of windings 102C wound around the stator core tooth 102T. The stator core tooth 102T defines at least part of a stator core. Each unit 100 is operable to generate a magnetic field generally parallel to the axis X. The units 100 may be generally evenly distributed around the axis X. The stator core teeth 102T of the units 100 may or may not be connected via a yoke. The stator S also includes a heat dissipation arrangement HD for facilitating dissipation of heat from one or more of the stator core teeth 102T, or more generally from one or more of the stator cores, during operation of the stator S. While not specifically illustrated, the stator S further includes other components such as electrical interconnects connected with the sets of windings, stator terminals, and a stator housing (e.g., with inlet/outlet ports for coolant, opening(s) for stator terminals or related electrical connections, etc.).

FIGS. 2A to 2F schematically show a unit 200 of a stator in one embodiment. The unit 200 may be an example of one or more of the units 100 in FIG. 1. As shown in FIGS. 2A to 2D, the unit 200 includes an axially extending stator core tooth 202T and two stator core shoes 202S1, 202S2 arranged at opposite axial ends of the stator core tooth 202T. The stator core shoes 202S1, 202S2 have generally the same shape and size, and they may be integrally formed with or attached to the stator core tooth 202T. The stator core shoes 202S1, 202S2 are each shaped as a generally trapezoidal prism, with a generally trapezoidal cross section (trapezium with rounded corners) where the short base of the trapezium provides the lowermost end E1 (e.g., radially innermost end with reference to the arrangement in FIG. 1) of the stator core shoe 202S1, 202S2 and the long base of the trapezium of the trapezium provides the uppermost end E2 (e.g., radially outermost end with reference to the arrangement in FIG. 1) of the stator core shoe 202S1, 202S2. The stator core shoes 202S1, 202S2 each includes an axially outer surface (with a generally trapezoidal cross section) further away from the stator core tooth 202T and an axially inner surface closer to the stator core tooth 202T. The axially inner surfaces of the stator core shoes 202S1, 202S2 face each other. The axially inner surfaces of the stator core shoes 202S1, 202S2 and the surface of the stator core tooth 202T together define a loop-like channel.

In this embodiment, the axially inner surfaces of the stator core shoes 202S1, 202S2 each includes a lowermost portion defining a lowermost end E1 (e.g., radially innermost end with reference to the arrangement in FIG. 1) and an uppermost portion defining an uppermost end E2 (e.g., radially outermost end with reference to the arrangement in FIG. 1). The lowermost end E1 is higher (further away from the axis X with reference to the arrangement in FIG. 1) than a lowermost end (e.g., radially innermost end with reference to the arrangement in FIG. 1) defined by the material 204 and the set of windings 202C. The uppermost end E2 is lower (closer to the axis X with reference to the arrangement in FIG. 1) than an uppermost end (e.g., radially outermost end with reference to the arrangement in FIG. 1) defined by the material 204 and the set of windings 202C.

Figure 2A:
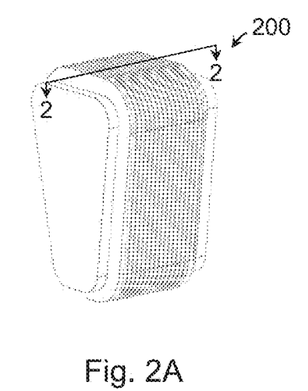
FIG. 2A is a schematic diagram of a unit of a stator for an axial flux machine in one embodiment.
Figure 2B:
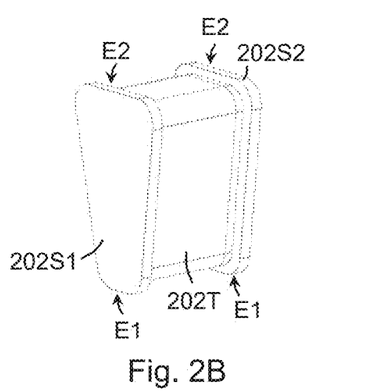
FIG. 2B is a schematic diagram of the stator core tooth and stator core shoes of the unit of FIG. 2A.

The unit 200 also includes a set of windings (or coil) 202C wound around the stator core tooth 202T. In this embodiment, the set of windings 202C is provided by a flat wire (e.g., copper wire) with a generally rectangular cross section. The set of windings 202C is received by the channel (and is partly extended beyond the channel) and is not in direct contact with the axially inner surfaces of the stator core shoes 202S1, 202S2.

In this embodiment, a material 204 is thermally coupled between the stator core tooth 202T and the set of windings 202C to enable or facilitate heat conduction (i.e., heat transfer by conduction) between them. The material 204 may be arranged in layer(s). With the material 204, heat generated or accumulated in the stator core tooth 202T during operation of the stator can be dissipated more quickly and/or more effectively (when compared to without the material(s), because coolant fluid cannot easily flow (move) between the stator core tooth 202T and the set of windings 202C). In one embodiment in which the stator is yokeless (i.e., the stator cores are not in thermal contact with a yoke and no/limited thermal conduction path is available for conducting heat away from the stator core), the material 204 may be particularly useful for facilitating heat dissipation from the stator core tooth 202T (or more generally the stator core).

The material 204 includes a thermally conductive and electrically insulating material. The thermally conductive and electrically insulating material may be a potting material. The potting material may be a potting compound such as epoxy-resin, with or without additive for improving thermal conductivity. The potting compound may further provide improved mechanical strength, vibration or shock resistance, corrosion protection, and/or chemical protection for the stator. A person skilled in the art understands that other potting material, or thermally conductive and electrically insulating material, exists and can be used as material 204.

Figure 2C:
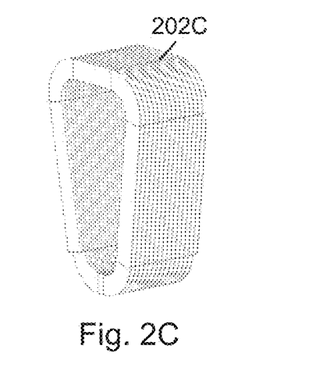
FIG. 2C is a schematic diagram of the set of windings of the unit of FIG. 2A.
Figure 2D:
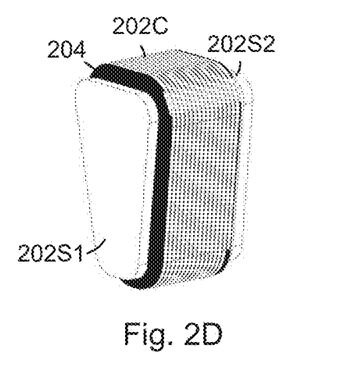
FIG. 2D is a schematic diagram of the unit of FIG. 2A (with a highlighted part)
Figure 2E:
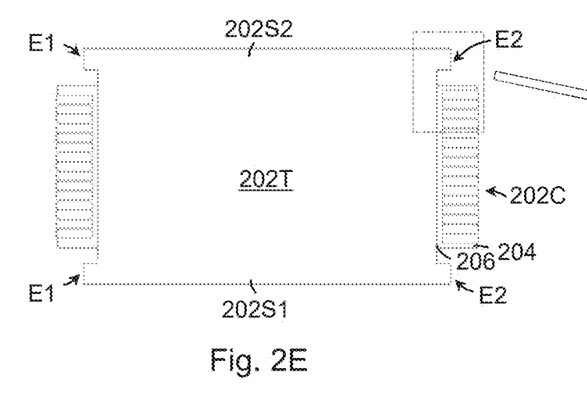
FIG. 2E is a cross sectional view of the unit of FIG. 2A taking along line 2-2.
Figure 2F:
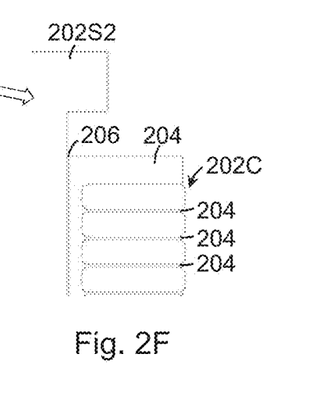
FIG. 2F is an enlarged view of part of the unit of FIG. 2E.

As shown in FIGS. 2D to 2F, in this embodiment, the material 204 is filled (substantially completely) in a gap between the stator core tooth 202T and the set of windings 202C, filled (substantially completely) in a space between all adjacent turns of the set of windings 202C, and covers the axial end surfaces of the set of windings 202C, without contacting the axially inner surfaces of the stator core shoes 202S1, 202S2. By filling the material 204 in the gap between the stator core tooth 202T and the set of windings 202C, the thermal coupling between the stator core tooth 202T and the set of windings 202C may be more uniform and/or effective. By filling the material 204 in the space between all adjacent turns of the set of windings 202C, heat distribution in the set of windings may be more uniform and/or heat may be more readily conducted away from the stator core tooth 202T. In this embodiment, the material 204 is disposed such that the circumferential surface of the set of windings is generally exposed (i.e., not covered by the material 204) for contacting a flow of coolant fluid. This helps to facilitate cooling of the set of windings 202C hence the stator core tooth 202T (or more generally the stator core).

Further, in this embodiment, a thin layer of material 206 (e.g., with a thickness of about 10 microns to about 1000 microns) is disposed between the stator core tooth 202T and the material 204. The material 206 is different from the material 204. The material 206 is an electrically insulating material that may or may not have the same thermal conductivity as the material 204. The material 206 can provide improved electrical insulation between the stator core tooth 202T and the set of windings 202C. This may be particularly useful if the material 204 is degraded, fatigued, damaged, and/or worn out. The layer of material 206 may be provided by an electrical insulation tape. A person skilled in the art understands that other electrically insulating material exists and can be used as material 206.

Referring to FIGS. 2E and 2F, in this embodiment, the axially inner surfaces of the stator core shoes 202S1, 202S2 and part of the surface of the stator core tooth 202T are exposed (i.e., not covered by other material(s)) for contacting a flow of coolant fluid.

In this embodiment, the heat dissipation arrangement for facilitating dissipation of heat from the stator core tooth 202T during operation of the stator includes, at least, the material 204 and the exposed axially inner surfaces of the stator core shoes 202S1, 202S2. During operation, heat generated or accumulated in the stator core tooth 202T can be transferred to the material 204, the set of windings 202C, and the stator core shoes 202S1, 202S2, and can be dissipated through (i) the exposed parts of the material 204 and the set of windings 202C, (ii) the exposed surface of the stator core tooth 202T, and (iii) the exposed axially inner surfaces of the stator core shoes 202S1, 202S2, all of which are in contact with a flow of coolant fluid.

FIGS. 2C to 2E show that the wire of the set of windings 202C has a relatively high turn density (hence the space between adjacent turns of the set of windings is relatively small/tight). For example, in one embodiment, a ratio of a width of the space between adjacent turns of the wire (measured generally parallel to the axial direction) to a cross sectional width of the wire (measured generally parallel to the axial direction) may be less than 1:1. However, in another embodiment, the turn density of the wire of the set of windings 202C can be different. For example, in one embodiment, a ratio of a width of the space between adjacent turns of the wire (measured generally parallel to the axial direction) to a cross sectional width of the wire (measured generally parallel to the axial direction) may be between about 1:1 to about 2:1. It has been found that such a ratio may provide a relatively large space between adjacent turns of the set of windings, which may either allow coolant fluid to flow in or through the space more easily/effectively and hence carry heat away more quickly and/or effectively (if the space is not occupied by material 204) or allow more effective conduction of heat away from the stator core tooth 202T (if the space is occupied by material 204).

Figure 3A:
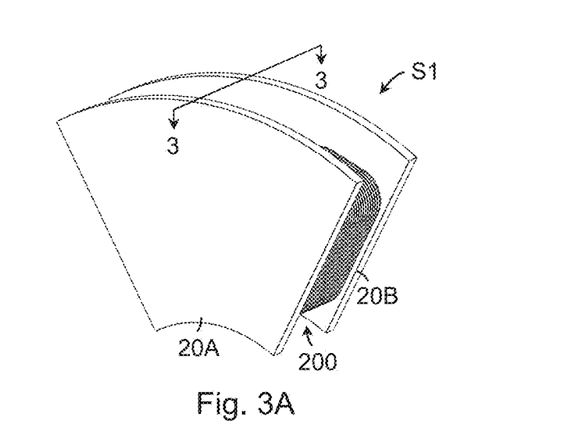
FIG. 3A is a schematic diagram of part of a stator for an axial flux machine in one embodiment.
Figure 3B:
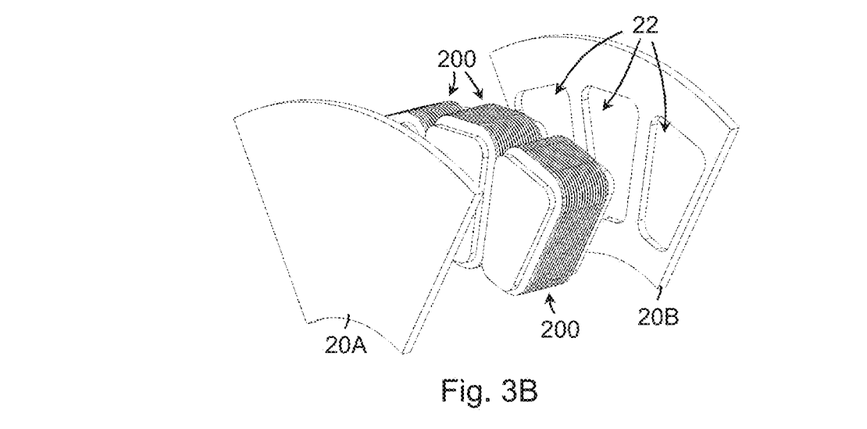
FIG. 3B is an exploded view of the part of the stator of FIG. 3A.
Figure 3C:
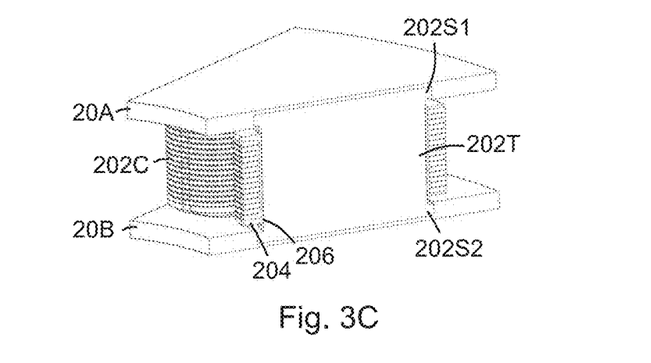
FIG. 3C is a cross sectional view of the part of the stator of FIG. 3A taking along line 3-3.

FIGS. 3A to 3C schematically show part of a stator S1 in one embodiment. The part of the stator S1 shown includes three of the units 200 disposed generally circumferentially around an axis, and a stator housing receiving the units 200 (only part of the walls of the stator housing is shown). In this embodiment, the stator housing receives the units 200 and includes at least two walls 20A, 20B arranged at opposite axial ends of the units 200 (only part of the walls 20A, 20B is shown). The walls 20A, 20B may be made of composite materials. The wall 20A includes multiple cavities 22 each receiving a stator core shoe 202S1 of a corresponding unit 200. In this embodiment, the cavity 22 on the wall 20A is shaped and sized to generally correspond to the shape and size of the stator core shoe 202S1. The stator core shoe 202S1 may be bonded to the cavity 22 using chemical means (e.g., adhesive) and/or may be attached to the cavity 22 using mechanical engagement. The wall 20B includes multiple cavities 22 each receiving a stator core shoe 202S2 of a corresponding unit 200. In this embodiment, the cavity 22 on the wall 20B is shaped and sized to generally correspond to the shape and size of the stator core shoe 202S2. The stator core shoe 202S2 may be bonded to the cavity 22 using chemical means (e.g., adhesive) and/or may be attached to the cavity 22 using mechanical engagement. The walls 20A, 20B are not in contact with the material 204, the material 206, and the set of windings 202C. The stator housing, including the walls 20A, 20B, may define a space in which a coolant fluid can flow to carry heat away from the stator components. The heat dissipation arrangements of the units 200 may help to reduce undesirable effect of the heat generated or accumulated in the stator core tooth 202T (or more generally the stator core) on the walls 20A, 20B and, if present, on the adhesive that bonds the stator core shoes 202S1, 202S2 to the cavities 22 in the walls 20A, 20B.

FIGS. 4A to 4F schematically show a unit 400 of a stator in one embodiment. The unit 400 may be an example of one or more of the units 100 in FIG. 1. The unit 400 may be identical to the unit 200 except for the stator core shoes.

Referring to FIGS. 4A to 4F, the unit 400 includes an axially extending stator core tooth 402T (e.g., same as stator core tooth 202T) and two stator core shoes 402S1, 402S2 arranged at opposite axial ends of the stator core tooth 402T. Like the stator core shoes 202S1, 202S2, the stator core shoes 402S1, 402S2 have generally the same shape and size, and they may be integrally formed with or attached to the stator core tooth 402T. The stator core shoes 402S1, 402S2 are each shaped as a generally trapezoidal prism, with a generally trapezoidal cross section (trapezium with rounded corners) where the short base of the trapezium provides the lowermost end (e.g., radially innermost end with reference to the arrangement in FIG. 1) of the stator core shoe and the long base of the trapezium of the trapezium provides the uppermost end (e.g., radially outermost end with reference to the arrangement in FIG. 1) of the stator core shoe. The stator core shoes 402S1, 402S2 each include an axially outer surface (with a generally trapezoidal cross section) further away from the stator core tooth 402T and an axially inner surface closer to the stator core tooth 402T. The axially inner surfaces of the shoes 402S1, 402S2 face each other. The axially inner surfaces of the stator core shoes 402S1, 402S2 and the surface of the stator core tooth 402T together define a loop-like channel.

In this embodiment, the axially inner surfaces of the stator core shoes 202S1, 202S2 each includes a lowermost portion defining a lowermost end E1' (e.g., radially innermost end with reference to the arrangement in FIG. 1) and an uppermost portion defining an uppermost end E2' (e.g., radially outermost end with reference to the arrangement in FIG. 1). The lowermost end E1' is lower (closer to the axis X with reference to the arrangement in FIG. 1) than a lowermost end (e.g., radially innermost end with reference to the arrangement in FIG. 1) defined by the material 204 and the set of windings 202C. The uppermost end E2' is higher (further away from the axis X with reference to the arrangement in FIG. 1) than an uppermost end (e.g., radially outermost end with reference to the arrangement in FIG. 1) defined by the material 204 and the set of windings 202C.

Figure 4A:
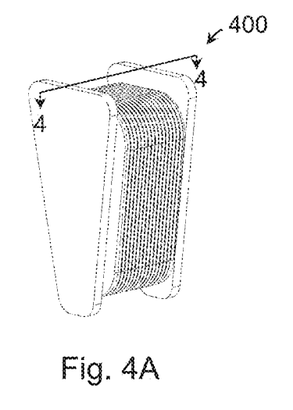
FIG. 4A is a schematic diagram of a unit of a stator for an axial flux machine in one embodiment.
Figure 4B:
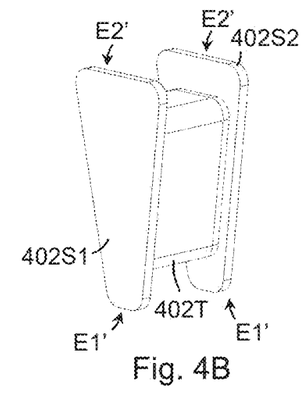
FIG. 4B is a schematic diagram of the stator core tooth and stator core shoes of the unit of FIG. 4A.
Figure 4C:
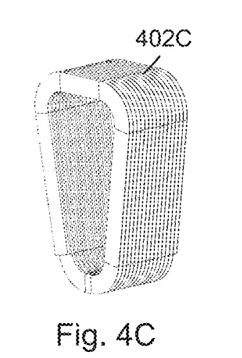
FIG. 4C is a schematic diagram of the set of windings of the unit of FIG. 4A.
Figure 4D:
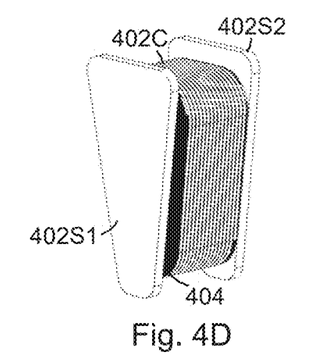
FIG. 4D is a schematic diagram of the unit of FIG. 4A (with a highlighted part)

The unit 400 also includes a set of windings (or coil) 402C wound around the stator core tooth 402T. The set of windings 402C may be the same as the set of windings 202C so, for brevity, details of the windings 402C will not be further described.

Figure 4E:
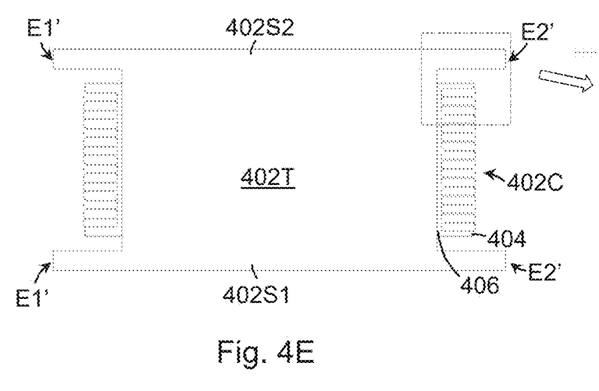
FIG. 4E is a cross sectional view of the unit of FIG. 4A taking along line 4-4.
Figure 4F:
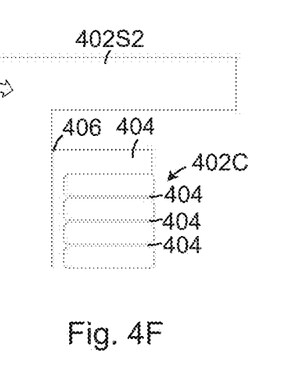
FIG. 4F is an enlarged view of part of the unit of FIG. 4E.

In this embodiment, a material 404 is thermally coupled between the stator core tooth 402T and the set of windings 402C to enable or facilitate heat conduction (i.e., heat transfer by conduction) between them. The material 404 may be the same as material 204. Further, a thin layer of material 406 (e.g., with a thickness of about 10 microns to about 1000 microns) is disposed between the stator core tooth 402T and the material 404. The material 406 may be the same as material 206. For brevity, details of the materials 404, 406 will not be further described.

Referring to FIGS. 4E and 4F, in this embodiment, the axially inner surfaces of the stator core shoes 402S1, 402S2 and part of the surface of the stator core tooth 402T are exposed (i.e., not covered by other material(s)) for contacting a coolant fluid. Compared with the stator core shoes 202S1, 202S2, the stator core shoes 402S1, 402S2 has a larger exposed area (in particular in the radial direction, due to the arrangement of the ends E1', E2' relative to the ends defined by the material 404 and the set of windings 402C). A larger exposed area on the axially inner surfaces of the stator core shoes 402S1, 402S2 (i.e., a larger contact area with the flow of coolant fluid) can improve heat dissipation from the stator core shoes 402S1, 402S2 hence from the stator core tooth 402T. Also, as the increased exposed area on the axially inner surfaces of the stator core shoes 402S1, 402S2 is mainly in the vertical direction (radial direction with reference to the arrangement in FIG. 1), the circumferential density and/or compactness of generally circumferentially disposed units 400 in the stator may be substantially unaffected.

In this embodiment, the heat dissipation arrangement for facilitating dissipation of heat from the stator core tooth 402T during operation of the stator includes, at least, the material 404 and the exposed axially inner surfaces of the stator core shoes 402S1, 402S2. During operation, heat generated or accumulated in the stator core tooth 402T can be transferred to the material 404, the set of windings 402C, and the stator core shoes 402S1, 402S2, and can be dissipated through (i) the exposed parts of the material 404 and the set of windings 402C, (ii) the exposed surface of the stator core tooth 402T, and (iii) the exposed axially inner surfaces of the stator core shoes 402S1, 402S2, all of which are in contact with a flow of coolant fluid.

Figure 5A:
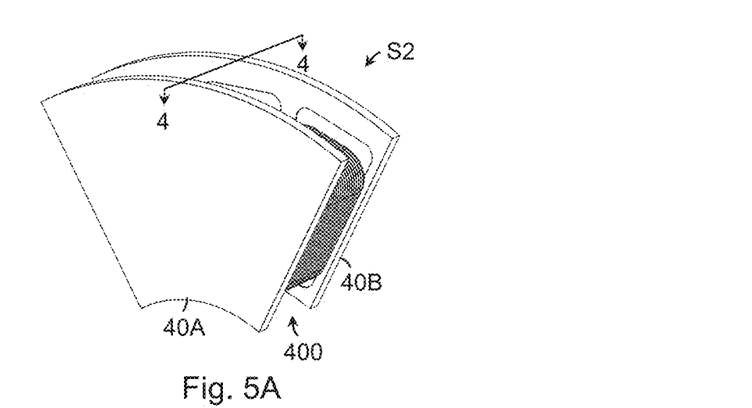
FIG. 5A is a schematic diagram of part of a stator for an axial flux machine in one embodiment.
Figure 5B:
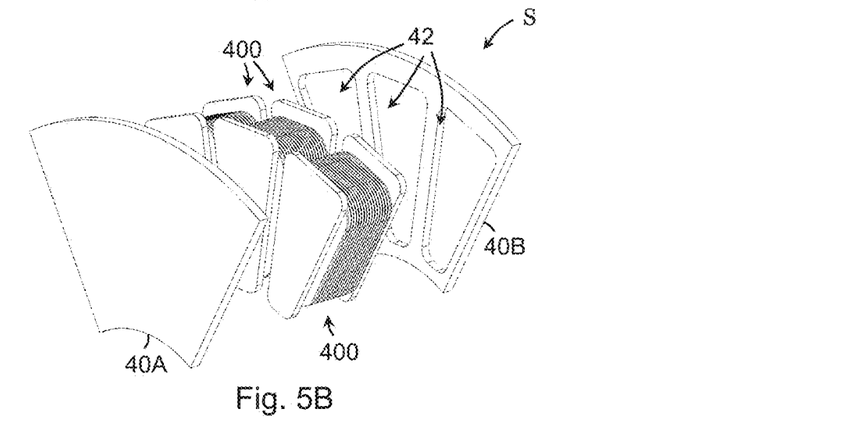
FIG. 5B is an exploded view of the part of the stator of FIG. 5A.
Figure 5C:
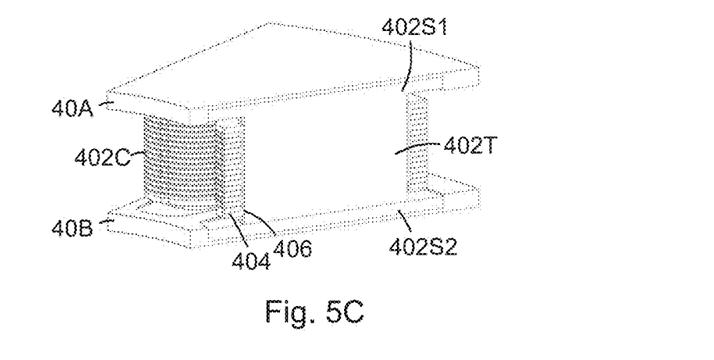
FIG. 5C is a cross sectional view of the part of the stator of FIG. 5A taking along line 5-5.

FIGS. 5A to 5C schematically show part of a stator S2 in one embodiment. The part of the stator S2 shown includes three of the units 400 disposed generally circumferentially around an axis, and a stator housing receiving the units 400 (only part of the walls of the stator housing is shown). The stator housing of the stator S2 in this embodiment may be the same as the stator housing of the stator S1 of FIGS. 3A to 3C, except for the size of the cavities 42 formed in the walls 40A, 40B. In this embodiment, the cavities 42 are shaped and sized to generally correspond to the shape and size of the stator core shoes 402S1, 402S2 (which are larger than the stator core shoes 202S1, 202S2). For brevity, details of the stator housing of the stator S2 will not be further described.

FIGS. 6A to 6D schematically show a stator S3 in one embodiment. The stator S3 includes eighteen units 200 disposed generally circumferentially around an axis X and a stator housing 60 receiving the units 200. The stator housing 60 includes two end walls 60A, 60B arranged in planes generally perpendicular to the axis and a circumferentially extending wall 60C connecting the two end walls 60A, 60B. The walls 60A, 60B may be the same as the walls 20A, 20B, except that for each cavity 62 in each of the walls 60A, 60B, a through-hole 64 is formed in the corresponding wall 60A, 60B to expose part of the axially outer surface of the corresponding stator core shoe 202S1, 202S2 received in the cavity 62. The through-hole 64 allows a flow of coolant fluid to contact the exposed axially outer surface, to dissipate heat from stator core shoe 202S1, 202S2 and hence from the stator core tooth 202T during operation of the stator S3. In one example, the flow of coolant fluid that contacts the exposed axially outer surface of the stator core shoe 202S1, 202S2 can be gas (e.g., natural air flow or forced/induced air flow) or liquid, and the flow of coolant fluid that flows into and out of the stator housing 60 can be liquid. In this embodiment, the through-hole 64 has substantially the same shape and center as, and a smaller size than, the axially outer surface of the corresponding stator core shoe 202S1, 202S2 received in the cavity 62. The through-hole 64 may thus promote more uniform heat dissipation from the axially outer surface of the corresponding stator core shoe 202S1, 202S2. Also, with through-holes 64 provided for both stator core shoes 202S1, 202S2 of each unit 200, heat may be dissipated from the stator core tooth 202T more effectively and/or more quickly.

Figure 6A:
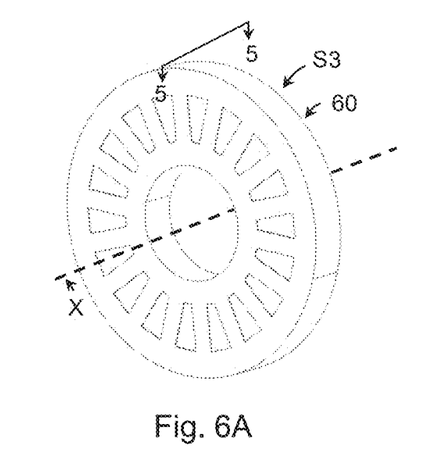
FIG. 6A is a schematic diagram of a stator for an axial flux machine in one embodiment.
Figure 6B:
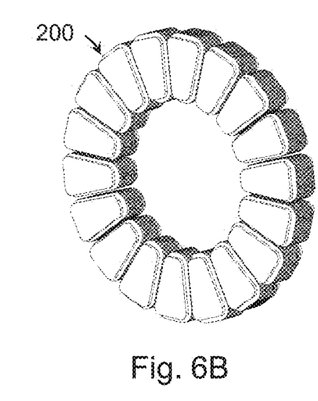
FIG. 6B is a schematic diagram of some internal components of the stator of FIG. 6A.
Figure 6C:
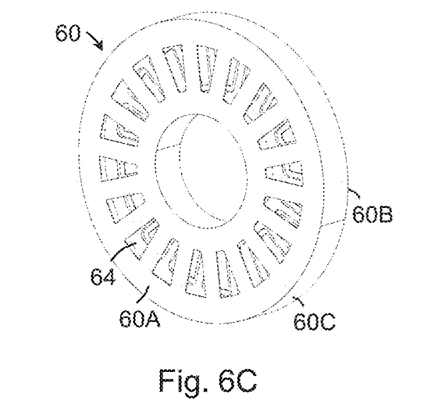
FIG. 6C is a schematic diagram of the housing of the stator of FIG. 6A.
Figure 6D:
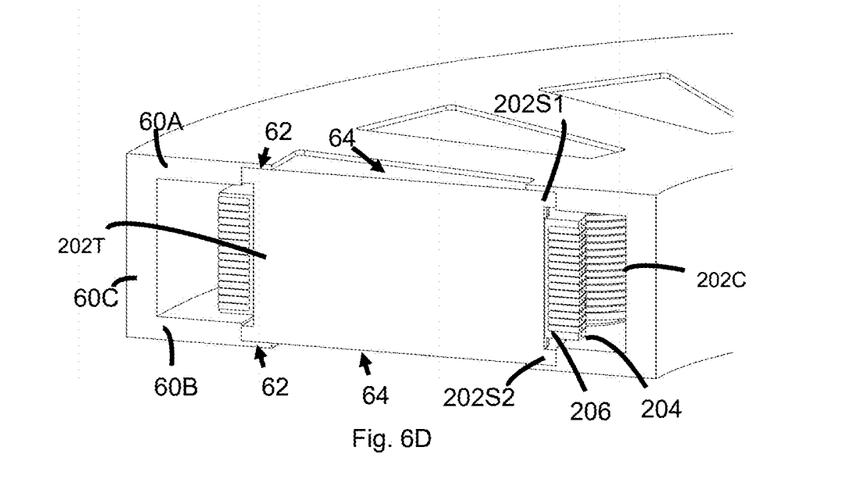
FIG. 6D is a cross sectional view of part of the stator of FIG. 6A taking along line 6-6.

In this embodiment, the heat dissipation arrangement for facilitating dissipation of heat from the stator core tooth 202T during operation of the stator S3 includes, at least, the material 204, the exposed axially inner surfaces of the stator core shoes 202S1, 202S2, and the through-holes 64 (or the exposed axially outer surfaces of the stator core shoes 202S1, 202S2). During operation, heat generated or accumulated in the stator core tooth 202T can be transferred to the material 204, the set of windings 202C, and the stator core shoes 202S1, 202S2, and can be dissipated through (i) the exposed parts of the material 204 and the set of windings 202C, (ii) the exposed surface of the stator core tooth 202T, (iii) the exposed axially inner surfaces of the stator core shoes 202S1, 202S2, and (iv) the exposed axially outer surfaces of the stator core shoes 202S1, 202S2, each of which are in contact with a flow of coolant fluid.

In one embodiment, the stator S3 may include the units 400 instead of the units 200.

FIGS. 7A to 7D schematically show some axial flux machines in some embodiments.

Figure 7A:
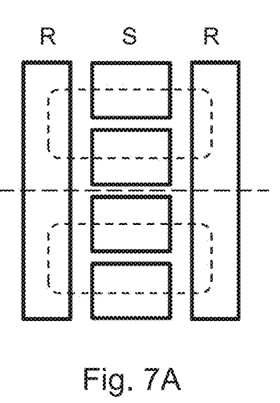
FIG. 7A is a schematic diagram of an axial flux machine in one embodiment.

FIG. 7A shows a yokeless and segmented armature (YASA) machine in one embodiment, with two rotors R (include magnets) arranged on two sides of a stator S coaxially. The stator S of the yokeless and segmented armature (YASA) machine may include one or more of the disclosed heat dissipation arrangement for facilitating dissipation of heat from one or more of the stator cores (at least one or more of the stator core teeth) during operation of the stator S.

Figure 7B:
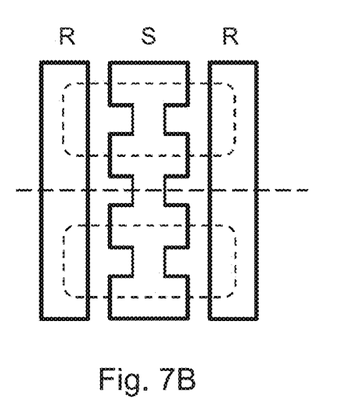
FIG. 7B is a schematic diagram of an axial flux machine in one embodiment.

FIG. 7B shows an axial flux interior segmented (AFIS) machine in one embodiment, with two rotors R (include magnets) arranged on two sides of a stator S coaxially. The stator S of the AFIS machine may include one or more of the disclosed heat dissipation arrangement for facilitating dissipation of heat from one or more of the stator cores (at least one or more of the stator core teeth) during operation of the stator S.

Figure 7C:
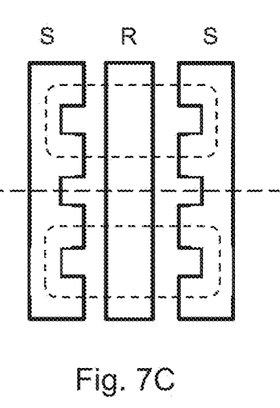
FIG. 7C is a schematic diagram of an axial flux machine in one embodiment.

FIG. 7C shows an axial flux interior rotor (AFIR) machine in one embodiment, with two stators S arranged on two sides of a rotor R (include magnets) coaxially. The stator S of the AFIR machine may include one or more of the disclosed heat dissipation arrangement for facilitating dissipation of heat from one or more of the stator cores (at least one or more of the stator core teeth) during operation of the stator S.

Figure 7D:
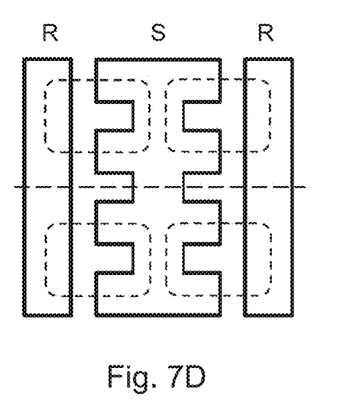
FIG. 7D is a schematic diagram of an axial flux machine in one embodiment.

FIG. 7D shows a TORUS machine in one embodiment, with two rotors R (include magnets) arranged on two sides of a stator S coaxially. The stator S of the TORUS machine may include one or more of the disclosed heat dissipation arrangement for facilitating dissipation of heat from one or more of the stator cores (e at least one or more of the stator core teeth) during operation of the stator S.

Figure 8:
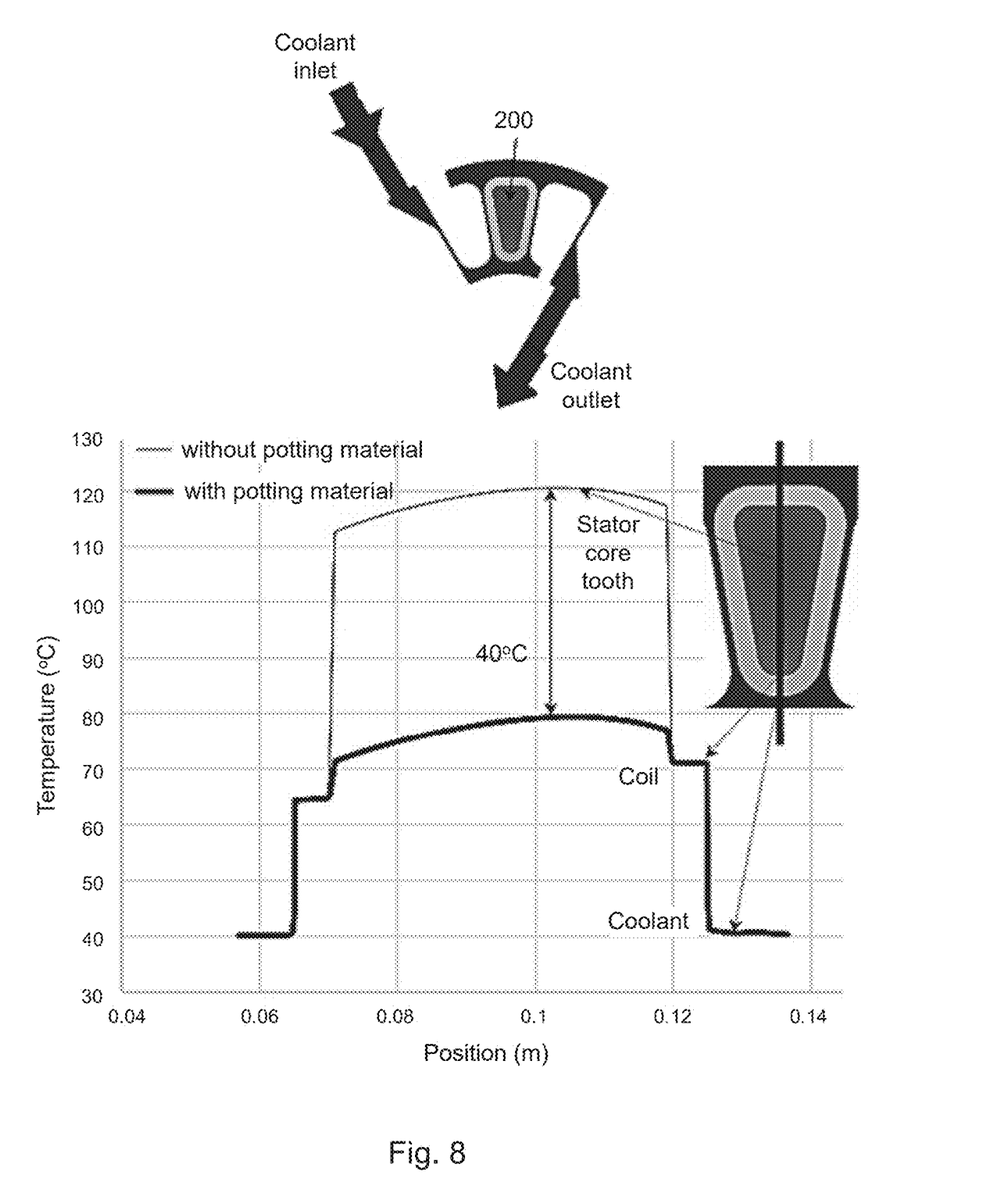
FIG. 8 is a diagram showing an example simulation of heat dissipation in a stator of an axial flux machine (using potting material in one embodiment vs without using potting material).

FIG. 8 shows an example simulation of heat dissipation in a stator of an axial flux machine in one embodiment. In this simulation, the set up used includes a unit (with stator core tooth and a set of windings wound around the stator core tooth) operating at rated-power 65 KW and a flow of coolant from a coolant inlet to a coolant outlet. The coolant at the inlet is at 40° C. and has a flow rate of 20 liters per minute. Two cases are compared in this example simulation: Case I-a thermally conductive and electrically insulating potting material 204 thermally coupled between the stator core tooth 202T and the set of windings 202C; and Case II-no potting material is arranged in the gap between the stator core tooth 202T and the set of windings 202C (only coolant fluid such as air is in the gap but the coolant fluid cannot effectively flow in the restricted space of the gap hence cannot effectively dissipate heat). As shown in the graph, in particular the temperature distribution along the line of symmetry of the unit of the two cases, case I shows a more significant drop in the temperature of the stator core tooth than case II. This shows that the thermally conductive and electrically insulating potting material 204 is more effective than the coolant fluid (air which has no/limited flow) in facilitating dissipation of heat from the stator core tooth (or more generally the stator core).

The above embodiments of the invention have provided various means to facilitate dissipation of heat from the stator core. For example, in one embodiment, a material such as potting material with high thermal conductivity is used to thermally couple the stator core with the set of windings to promote heat dissipation from the stator core. For example, in one embodiment, the turn density of the set of windings is arranged to provide a relatively large space between adjacent turns of the set of windings. The relatively large space between adjacent turns of the set of windings can receive the potting material or facilitate coolant fluid flow to improve heat transfer. For example, in one embodiment, the stator core shoe is extended to increase the exposed surface area for contacting a flow of coolant fluid hence for heat dissipation. For example, in one embodiment, the opening(s) formed on the stator housing may expose the outer surface of the first stator core shoe and/or the outer surface of the second stator core shoe to for contacting a flow of coolant fluid hence for heat dissipation.

It will be appreciated by a person skilled in the art that variations and/or modifications may be made to the described and/or illustrated embodiments to provide other embodiments. Thus, the described and/or illustrated embodiments should be considered in all respects as illustrative and not restrictive. For example, the number of stator cores (the number of stator core teeth) and the number of the sets of windings may be different from those described and illustrated. For example, the shape, size, and/or configuration of stator cores (stator core teeth and optionally stator core shoes) and the sets of windings may be different from those described and illustrated. For example, one or more of the units may include only one stator core shoe. For example, the shape, size, and/or configuration of first stator core shoe and/or the second stator core shoe (if present) may be different from those described and illustrated. For example, the location, arrangement, and/or composition of the material(s) thermally coupled between the stator core and the set of windings may be different from those described and illustrated. For example, the shape, size, configuration, and/or material of stator housing may be different from those described and illustrated. For example, the various heat dissipation arrangements provided in the same embodiment may be implemented separately. For example, the various heat dissipation arrangements provided in different embodiments may be implemented together. For example, the heat dissipation arrangement involving one or more materials thermally coupled between the stator core and a corresponding set of windings can be arranged and/or configured differently from those described and illustrated. For example, the one or more materials need not be strictly disposed in or filled in a gap between the stator core tooth and the corresponding set of windings. For example, the one or more materials need not be filled in or be present in the space between adjacent turns of the set of windings. For example, the electrically insulating material between the stator core tooth and the one or more materials may be omitted, or additional electrically insulating material may be provided. For example, the axial flux machine needs not be a yokeless and segmented armature machine and can be other type of axial flux machine. Other variations and/or modifications may be possible.

It will also be appreciated by a person skilled in the art that the stator includes other components (e.g., electrical interconnects, stator terminals, etc.) not specifically illustrated and/or described (as these components are not directly related to the invention).

Example optional features of some embodiments are provided in the summary, the detailed description, and the dependent claims. Some embodiments may include one or more of these optional features whereas some embodiments may lack one or more of these optional features.

The invention claimed is:

1. A stator for an axial flux machine, comprising:
   a plurality of units disposed generally circumferentially around an axis, each of the units being operable to generate a magnetic field generally parallel to the axis and respectively comprises:
      an axially extending stator core tooth defining at least part of a stator core; and
      a set of windings wound around the stator core tooth;
   a heat dissipation arrangement for facilitating dissipation of heat from the stator core during operation of the stator;
      wherein at least one of the units comprises:
         a first stator core shoe arranged at a first axial end of the stator core tooth, and
         a second stator core shoe arranged at a second axial end of the stator core tooth;
      wherein the first stator core shoe and the second stator core shoe define part of the stator core;
      wherein an inner surface of the first stator core shoe, an inner surface of the second stator core shoe, and a surface of the stator core tooth together define a channel; and
      wherein at least part of the inner surface of the first stator core shoe is exposed and/or at least part of the inner surface of the second stator core shoe is exposed to provide the heat dissipation arrangement; and
   a stator housing receiving the plurality of units and comprising a first wall including one or more first cavities each receiving a respective first stator core shoe;
      wherein the heat dissipation arrangement comprises, for each of the one or more first cavities,
         at least one opening arranged at a location corresponding to the first cavity to expose at least part of an outer surface of the first stator core shoe.

2. The stator of claim 1, wherein the heat dissipation arrangement comprises:
   for at least one of the units, one or more materials thermally coupled between the stator core and a corresponding set of windings to enable or facilitate heat conduction between the stator core and the corresponding set of windings.

3. The stator of claim 2, wherein the one or more materials comprises a thermally conductive and electrically insulating material.

4. The stator of claim 3, wherein the thermally conductive and electrically insulating material comprises a potting material.

5. The stator of claim 2, wherein the one or more materials is arranged at least partly in a gap between the stator core tooth and the corresponding set of windings.

6. The stator of claim 5, wherein the gap is filled with the one or more materials.

7. The stator of claim 5,
   wherein the set of windings is provided by a wire; and
   wherein the one or more materials is further arranged at least partly in a space between adjacent turns of the wire.

8. The stator of claim 7, wherein a ratio of a width of the space between adjacent turns of the wire to a cross sectional width of the wire is between about 1:1 to about 2:1, where the width of the space and the cross sectional width are both in a direction parallel to the axis.

9. The stator of claim 5, wherein the one or more materials is arranged such that part of the corresponding set of windings is exposed.

10. The stator of claim 2, wherein each of the at least one unit with the one or more materials comprises:
    an electrically insulating material arranged between the stator core tooth and the one or more materials.

11. The stator of claim 1,
    wherein the inner surface of the first stator core shoe comprises a radially innermost portion defining a radially innermost end and a radially outermost portion defining a radially outermost end;
    wherein the exposed part of the inner surface of the first stator core shoe comprises the radially innermost portion and/or the radially outermost portion; and
    wherein
       the radially innermost end is closer to the axis than a radially innermost end defined by components received in the channel; and/or
       the radially outermost end is further away from the axis than a radially outermost end defined by components received in the channel.

12. The stator of claim 1,
    wherein the inner surface of the second stator core shoe comprises a radially innermost portion defining a radially innermost end and a radially outermost portion defining a radially outermost end;

wherein the exposed part of the inner surface of the second stator core shoe comprises the radially innermost portion and/or the radially outermost portion; and wherein the radially innermost end is closer to the axis than a radially innermost end defined by components received in the channel; and/or the radially outermost end is further away from the axis than a radially outermost end defined by components received in the channel.

13. The stator of claim 1, wherein the at least one opening for the first cavity comprises an opening having substantially the same shape and center as, and a smaller size than, an outer surface of the corresponding first stator core shoe.

14. The stator of claim 1, wherein the stator housing comprises a second wall including one or more second cavities each receiving a respective second stator core shoe; and wherein the heat dissipation arrangement comprises, for each of the one or more second cavities, at least one opening arranged at a location corresponding to the second cavity to expose at least part of an outer surface of the second stator core shoe.

15. The stator of claim 14, wherein the at least one opening for the second cavity comprises an opening having substantially the same shape and center as, and a smaller size than, an outer surface of the corresponding second stator core shoe.

16. The stator of claim 1, wherein the heat dissipation arrangement comprises, for at least one of the units:

a thermally conductive and electrically insulating material arranged at least partly in a gap between the stator core tooth and the corresponding set of windings, the thermally conductive and electrically insulating material comprises a potting material and is thermally coupled between the stator core and the corresponding set of windings to enable or facilitate heat conduction between the stator core and the corresponding set of windings; and an electrically insulating material arranged between the stator core tooth and the thermally conductive and electrically insulating material, the electrically insulating material is different from the thermally conductive and electrically insulating material.

17. The stator of claim 16, wherein the heat dissipation arrangement comprises, for each respective one of the units, the thermally conductive and electrically insulating material and the electrically insulating material.

18. The stator of claim 16, wherein the electrically insulating material is arranged in a relatively thick layer and the electrically insulating material is arranged in a relatively thin layer.

19. The stator of claim 16 wherein the electrically insulating material is arranged in a layer with a thickness of about 10 microns to about 1000 microns.

20. An axial flux machine comprising:

at least one of the stators of claim 1; and at least one rotor.

21. An electrical device or system comprising the axial flux machine of claim 20.

22. A stator for an axial flux machine, comprising:

a plurality of units disposed generally circumferentially around an axis, each of the units being operable to generate a magnetic field generally parallel to the axis and respectively comprises:

an axially extending stator core tooth defining at least part of a stator core; and a set of windings wound around the stator core tooth;

wherein each of the units comprises:

a first stator core shoe arranged at a first axial end of the stator core tooth, and a second stator core shoe arranged at a second axial end of the stator core tooth;

wherein the first stator core shoe and the second stator core shoe define part of the stator core;

a stator housing receiving the plurality of units and comprising:

a first wall including first cavities each receiving a respective first stator core shoe, and a second wall including second cavities each receiving a respective second stator core shoe; and a heat dissipation arrangement for facilitating dissipation of heat from the stator core during operation of the stator;

wherein the heat dissipation arrangement comprises, for each of the units:

one or more materials thermally coupled between the stator core and a corresponding set of windings to enable or facilitate heat conduction between the stator core and the corresponding set of windings;

at least part of an inner surface of the first stator core shoe that is exposed;

at least part of an inner surface of the second stator core shoe that is exposed;

for each of the first cavities, an opening arranged at a location corresponding to the first cavity to expose part of an outer surface of the first stator core shoe; and for each of the second cavities, an opening arranged at a location corresponding to the second cavity to expose part of an outer surface of the second stator core shoe.

* * * * *